M. DAVIS.
SUCTION FEEDER.
APPLICATION FILED JULY 19, 1917.
1,245,883.
Patented Nov. 6, 1917.
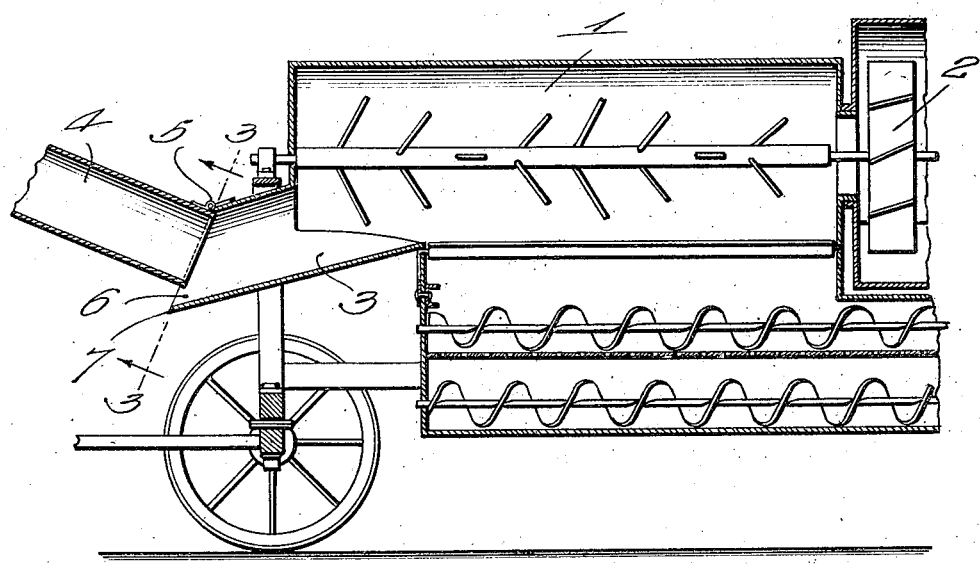
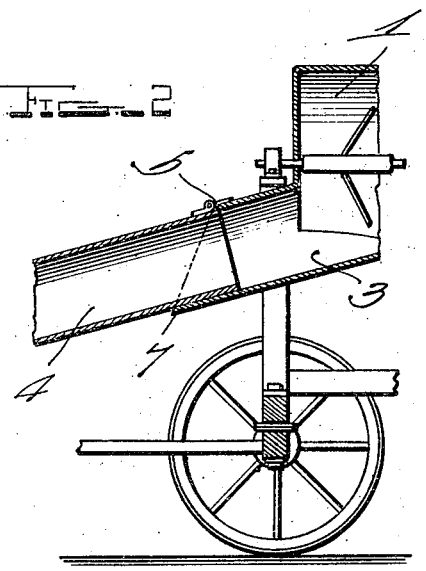
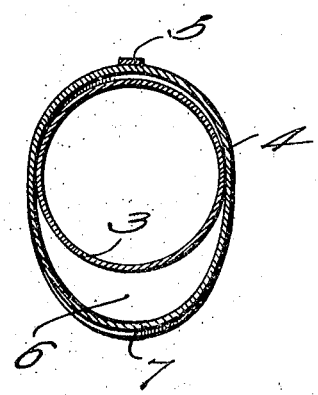
Inventor
Monroe Davis
Witness

UNITED STATES PATENT OFFICE.

MONROE DAVIS, OF ENID, OKLAHOMA.

SUCTION-FEEDER.

1,245,883.  Specification of Letters Patent.  Patented Nov. 6, 1917.

Application filed July 19, 1917. Serial No. 181,606.

*To all whom it may concern:*

Be it known that I, MONROE DAVIS, a citizen of the United States, residing at Enid, in the county of Garfield and State of Oklahoma, have invented certain new and useful Improvements in Suction-Feeders; and I do declare the following to be a full, clear, and exact description of the invention, such as will enable others skilled in the art to which it appertains to make and use the same.

My invention relates to improvements in feeding pipes for threshing and numerous other machines, the principal object being to provide a pipe of this character having novel means whereby the grain or other material passing therethrough is prevented from lodging in the angle which may necessarily exist between two sections of the pipe, such an angle being necessary in threshing machine feeders in order that the pipe may be swung vertically to receive the grain from different elevations.

With the foregoing general object in view, the invention resides in certain novel features of construction and unique combinations of parts to be hereinafter fully described and claimed, the descriptive matter being supplemented by the accompanying drawing which forms a part of this specification and in which:

Figure 1 is a side elevation of a threshing machine showing a vertical longitudinal section of the improved feeding pipe applied thereto;

Fig. 2 is a view similar to Fig. 1 but showing the two sections of the pipe moved into alinement; and, Fig. 3 is a vertical transverse section on the plane of the line 3—3 of Fig. 1.

In the drawings above briefly described, the numeral 1 designates the threshing chamber of a threshing machine such as that illustrated in my co-pending application filed on even date herewith under Serial No. 181,607, filed July 19, 1917, a fan 2 being provided for creating suction longitudinally through the chamber 1 to draw the grain into the latter and to expel the straw therefrom.

Fixedly carried by one end of the casing 1, is an inlet pipe section 3 which preferably inclines downwardly from said casing as shown. The outer end of the section 3 receives therein the inner end of a movable pipe section 4, the engagement between the two sections being substantially air-tight when these sections are in alinement as shown in Fig. 2. At their upper sides, however, the sections 3 and 4 are hinged together as indicated at 5, so that the outer section may be swung upwardly to permit the unthreshed grain to be fed thereto from a wagon or a stack, and when this angling of the two sections takes place, it is highly essential that an air inlet 6 be provided at the outer side of the angle. Otherwise the suction created through the inlet pipe, by the fan 2, will have a tendency to short-circuit around the inner side of the angle and will therefore not properly draw the grain into the casing or chamber 1. By the provision of the air inlet 6, however, air is admitted at the outer side of the angle and is drawn in a strong blast into the threshing chamber, thus insuring that the current of air passing through the inlet pipe as well as the auxiliary current being discussed, will co-act in carrying the grain into the chamber 1 without permitting it to lodge in the angle between the two pipe sections.

It will be observed that the side of the pipe section 3, opposite the hinge 5, is extended beyond the hinge line as indicated at 7, and that as the pipe section 4 is swung around the hinge, it gradually recedes a greater distance from the section 3, thus automatically increasing the size of the air inlet 6 as the angle between the two pipe sections is lessened. Similarly when the two sections are moved toward alinement, the size of the air inlet 6 is correspondingly decreased in size. It is thus insured that the strength of the auxiliary current of air shall be in strict proportion to the angle existing between the two pipe sections, it being necessary that the strength of the auxiliary current of air shall be greater when the angle between the two sections of the pipe is rather small, whereas the strength of this current need not be as great when said angle is increased. It is to be understood that the two sheet metal pipe sections are sufficiently flexible to spring wherever required as said sections are angles, thus preventing any binding action which would otherwise take place.

From the foregoing, taken in connection with the accompanying drawing, it will be obvious that although my invention is of extremely simple and inexpensive nature it will be highly efficient for the purpose intended, that is for preventing grain or other material from lodging in an angle existing between two sections of a suction feeder pipe. Although these sections are shown hingedly connected and relatively movable it is to be understood that the provision of an air inlet such as that designated by the numeral 6, would be of equal advantage at the angle of rigidly connected pipe sections. On account of this, I do not wish to be restricted to hingedly connected sections, and I wish it further understood that although certain specific details have been shown and described for illustrative purposes, numerous minor changes may well be made within the scope of the invention as claimed.

I claim as my invention:

A suction feeder pipe comprising two sections telescoping at one end, one side of one section being hinged to one side of the other section for permitting the two to be moved into angular relation, the side of the outer section remote from the hinge, extending beyond the hinge line and coöperating with the inner section in forming a restricted air inlet into the feeder pipe when the two sections are swung into angular relation.

In testimony whereof I have hereunto set my hand in the presence of two subscribing witnesses.

MONROE DAVIS.